April 20, 1954  R. C. HUGHES  2,675,564
STRETCHER
Filed July 13, 1949  3 Sheets-Sheet 1

INVENTOR.
ROBERT C. HUGHES
BY
Busser and Harding
ATTORNEYS.

April 20, 1954 R. C. HUGHES 2,675,564
STRETCHER
Filed July 13, 1949 3 Sheets-Sheet 2

INVENTOR.
ROBERT C. HUGHES
BY
Busser and Harding
ATTORNEYS.

April 20, 1954     R. C. HUGHES     2,675,564
STRETCHER

Filed July 13, 1949     3 Sheets-Sheet 3

INVENTOR.
ROBERT C. HUGHES
BY
ATTORNEYS.

Patented Apr. 20, 1954

2,675,564

UNITED STATES PATENT OFFICE 2,675,564

STRETCHER

Robert C. Hughes, Paoli, Pa.

Application July 13, 1949, Serial No. 104,515

5 Claims. (Cl. 5—82)

In case of accident to the human body, and particularly any accident characterized by broken bones, it is always important, and often of vital importance, to prevent any additional injury to the body in the course of transportation from the locus of the accident to a hospital or hospital base. In the case of broken bones, any serious displacement, before hospital treatment, beyond that produced by the accident itself, often produces conditions that make the remedial measures of the physician or surgeon more difficult and may, in some cases, prevent completely successful bodily repair. Indeed, in some cases, fatal outcomes arise not from the inherently serious character of the bodily injury, but from secondary injuries incurred during transport of the injured body. This is particularly true, although not altogether limited to, a broken bone in the spinal column.

The best insurance against such secondary injuries is to maintain the injured members in a rigid position relative to the remainder of the body; and the most effective insurance against any disturbance of such rigidity is to maintain the entire body in a rigid condition as a unit. Jolts, jars and other irregular movements of the carrier or stretcher during transport are usually unavoidable; but if the body is maintained rigid as a unit, the danger from such movements during travel from place to place is minimized. The necessity for maintaining rigidity of the body, between the place of accident and that of the application of remedial measures, is particularly essential in the case of the breakage of bones in the spinal column without involvement of injury to the spinal cord. A deviation from rigidity following the accident is attended with danger of injury to the spinal cord and consequent paralysis or death.

The object of my invention is to provide a stretcher which includes equipment whereby the entire body, after careful deposit on the carrier or stretcher, may be readily and quickly secured thereto in such a manner as to insure, not only that the body will be maintained in fixed position on the carrier or stretcher, but also that all parts of the body will be maintained in fixed relative positions until the hospital base is reached. Incidentally, my improved stretcher is adapted to maintain a broken leg or arm in fixed position relative to the body trunk, even though the equipment is not so manipulated as to hold the entire body rigid; but a primary advantage of the invention is its adaptability to guard against all secondary injuries where conditions make it difficult or impossible to correctly or completely diagnose the character or extent of the injuries at the locus of the accident.

Stretchers effective to accomplish the above purposes are disclosed in an application filed by me December 29, 1942, Serial No. 470,429, which has matured into Patent No. 2,377,940, issued June 12, 1945, and in an application filed by me January 29, 1945, Serial No. 575,052 which has matured into Patent No. 2,511,061, issued June 13, 1950. The stretcher forming the subject matter of the present invention embodies certain features of the inventions of said patent and application, but embodies also numerous improvements therein. The principal improvements are intended and adapted to provide a more flexible structure whereby the stretcher may be adjusted in various ways to fit human bodies of different sizes and regardless of variations in the relative lengths of the arms, legs and chest. The invention also has for its purpose to provide a stretcher the adjustable elements of which may be readily and quickly manipulated. The invention also has for its object to provide a stretcher which is of maximum strength and durability. These and other advantages of the invention will be fully understood by reference to the following description and the annexed drawings, which disclose a preferred embodiment of the invention. In the drawings—

Figure 3:
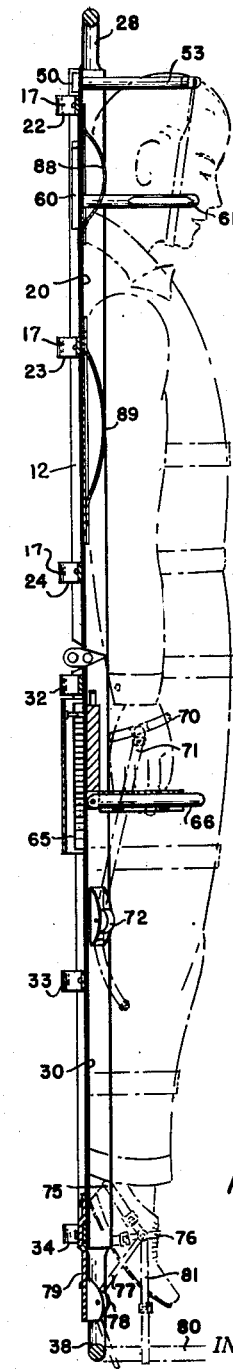
Fig. 3 is a longitudinal section on the line 3—3 of Fig. 1.

The stretcher comprises two sections a and b hinged together so as to be foldable one upon another. Section a comprises a base composed of a metal base plate 20 the longitudinal edges of which are formed to provide reinforcing longitudinally extending side channels 21, 21. Each of the channels includes a portion 10 forming an inside inclined leg of the channel extending between a top portion 11 of the channel and the stretcher base 20, and an outside downwardly extending leg 12. Thus the top portions 11 of the channels extend above the plane of the base 20 of the stretcher. Reinforcing cross bars 22, 23 and 24 extend transversely of the stretcher base and have turned up end portions 9 secured to the inside of the outside legs 12 of the side channels. Each of the cross bars is formed with inclined portions 15 and an elevated center portion 16 which is attached to the stretcher base 20. The lowermost portions 17 of the cross bars adjacent to the turned up end portions 9 form supports for the stretcher sections, as shown in Figure 3, when the stretcher is placed upon a table or other supporting surface. Section b comprises similarly formed parts, namely, a metal base plate 30, integral longitudinal reinforcing channels 31, 31 and reinforcing and supporting cross bars 32, 33 and 34.

Each base plate is provided with longitudinally extending slots 40 through which may be passed fastening straps. Each side bar has secured thereto longitudinally extending strap rails 41 through which fastening straps may be passed. These strap rails and slots are so located that straps 42 may be fastened over the body at any desired position between the head and the feet.

Figure 1:
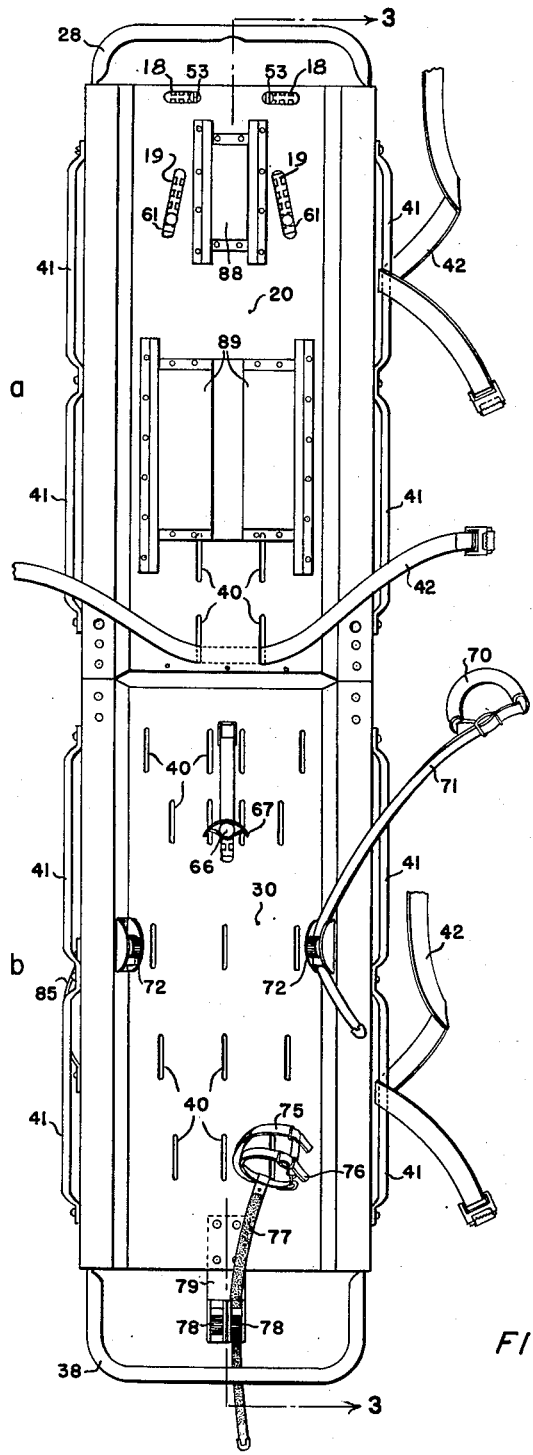
Fig. 1 is a plan view, and Fig. 2 an inverted plan view, of the stretcher.
Figure 2:
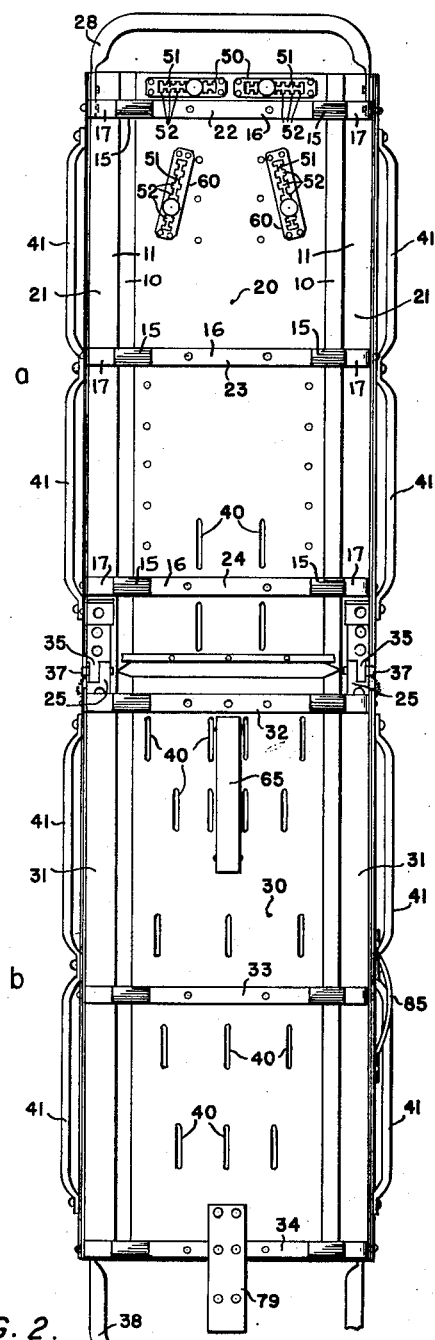
Figure 4:
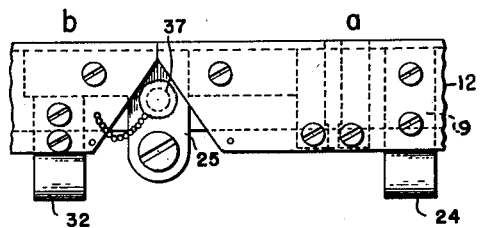
Figs. 4 and 5 are detail views of the hinged connection between the two halves or sections of the stretcher.
Figure 5:
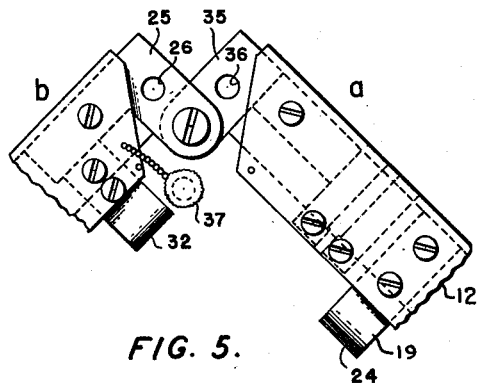
Figure 10:
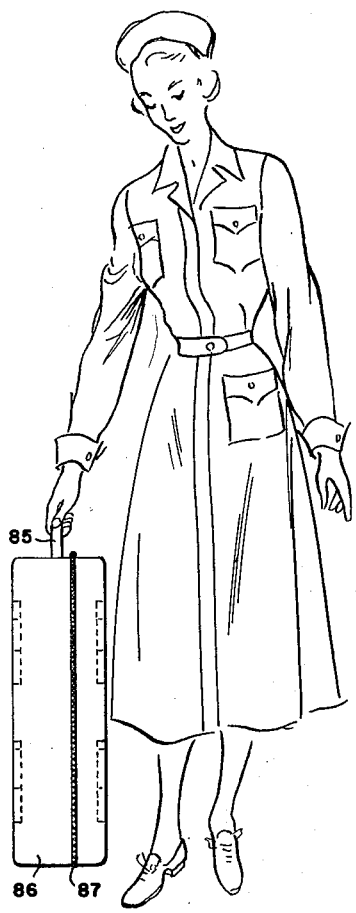
Figs. 10 and 11 are pictorial views, including end and side views respectively, of the stretcher when the two halves thereof are folded one upon another for convenience of handling and transportation.
Figure 11:
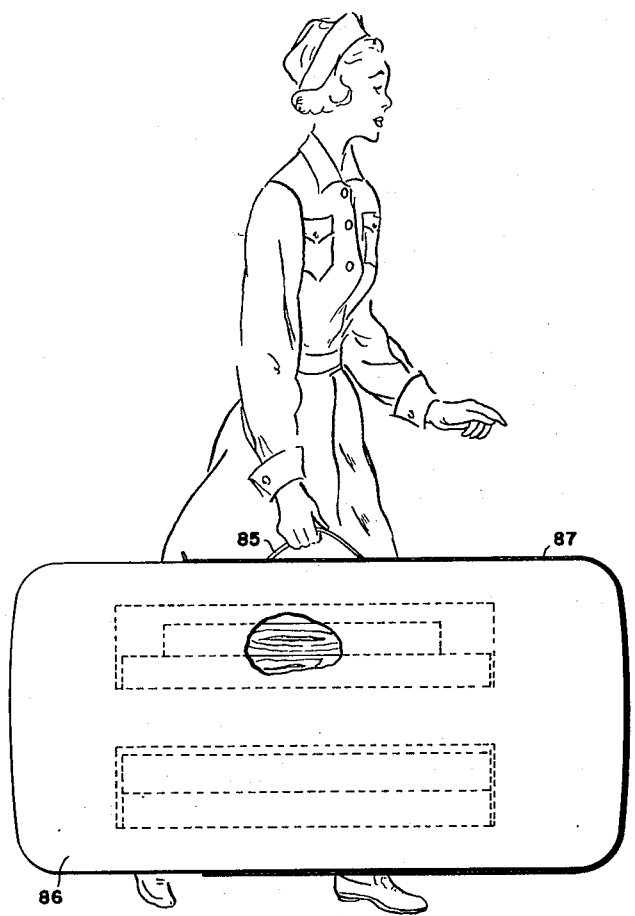

Adjacent ends of side channels 21 and 31 have bevelled ends, as shown in Figs. 4 and 5, and have secured respectively thereto arms 25 and 35 extending in different but parallel vertical planes and hinged together at their ends, thereby providing the hinged connection between the sections a and b that allows them to be folded one upon another, as shown in Figs. 10 and 11, or to be moved into alignment, as shown in Figs. 1, 2, 3 and 4, in position for receiving and holding the body. When the sections are so aligned, a pin 37, preferably carried by a flexible connection secured to one of the side bars, is passed through aligning holes 26 and 36 on the respective arms 25 and 35 to thereby hold the two sections a and b in their extended aligning positions. By means of handles 28 and 38, secured to the ends of sections a and b respectively, the sections a and b may be readily swung on their hinged connection, and, when the sections are aligned afford means for carrying the stretcher.

Figure 6:
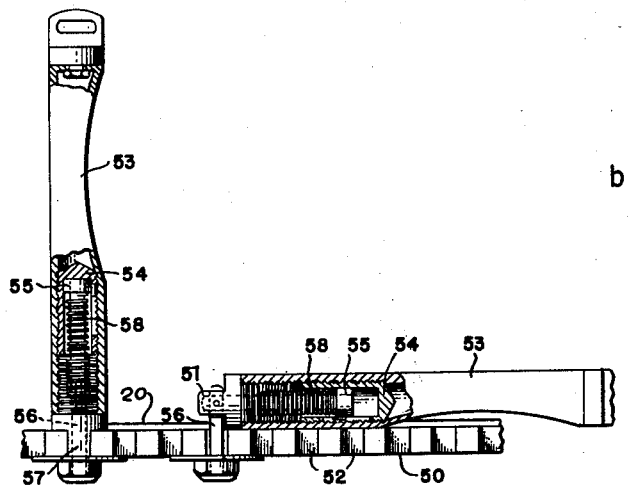
Fig. 6 is a detail sectional view, illustrating either one of a pair of adjustable side rests for the head, or the adjustable device adapted to engage the crotch of a body held on the stretcher.

Secured to the extreme end of the base 20 of section a are laterally extending plates 50 having slots 51 extending therealong with pairs of opposing notches 52 opening into the slots along the length thereof. An elongated opening 18 is provided in the base plate above the slot and notches in each of the plates 50. Resting upon each plate is a hollow bar 53 (see Fig. 6) into which is threaded a hollow member 54 in which is slidable a slide 55, the other end of the slide extending through the end closure of the hollow bar 53. Extending through the bottom of the plate 50 and the slot 51 therein is a pin 56 the shank of which is of a diameter small enough to allow it to slide through the slot 51. The pin 56 and slide 55 are pivotally connected. The bar 53, when in horizontal position, is slidable along the plate 50 into any desired position, whereupon it is swung on the pivotal connection between pin 56 and slide 55 into a vertical position (from right-hand to left-hand positions, Fig. 6), thereby causing a projection 57 on the end of the bar 53 to align with a pair of opposing notches 52; the bar 53 being moved, by the spring 58, to force the projection 57 into said pair of notches. To remove the bar 53 from its adjusted position it is pulled upward against the action of the spring 58 and then swung down into its horizontal position.

A pair of these bars 53 function as side rests for the upper part of the head.

A pair of slotted and notched plates 60, similar to plates 50 and extending longitudinally and slightly obliquely, are secured to the base plate 20 and to these plates are applied bars 61, similar to bars 53, and similarly constructed and operated to function as side head rests for the lower part of the head.

A slotted and notched plate 65, similar to plate 50, is secured to the base plate 30. It extends longitudinally thereof and midway between the sides of the base 30. To this plate is applied a bar 66, similar to bar 53 and similarly constructed and operated, whereby it is adjustable to engage the crotch of the body.

Figure 8:
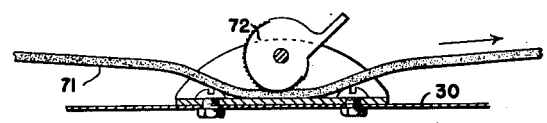
Figs. 8 and 9 are detail views of the means for holding the hands and feet of the body in fixed position.
Figure 9:
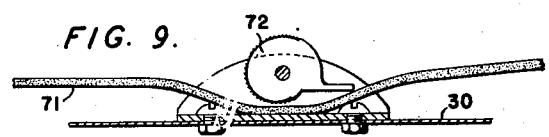

A band 70 is provided to enclose each hand just beyond the wrist and to this band is secured a strap 71 adapted to be held against the base plate 30 by means of a cam 72 (having preferably a corrugated or otherwise roughened periphery) turnable, on a support secured to the base plate 30, from the position shown in Fig. 9, to allow the strap to pass between it and the base plate, to the position shown in Fig. 8, in which the strap is pressed tightly against the base plate.

Bands 75 and 76 are secured to each foot (or to the shoe thereon) and to each other and from their point of junction extends a strap 77 which is confined against the base plate, or to an extension 79 of the base plate, by a cam 78 supported and operated like cam 72.

If desired upright bars 80 may be secured to the extreme end of section b and a strap 81 may extend from the junction of bands 75 and 76 to the bar 80 and may be tightened by means of a buckle and strap. This bar 80 should be pivotally connected to the section b so as to be swung down against it, and means should be provided to lock it in its vertical position. These features are not shown, since no claim herein is made thereto.

Applied to the face of the base plate 20 are light flexible arc-shaped metal supports 88 and 89 adapted to afford rests for the head or neck and for the back.

Figure 7:
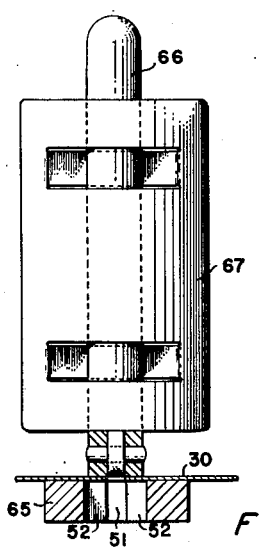
Fig. 7 is a detail view of a special crotch-engaging device.

Applicable to the bar 66 is a separate tubular-shaped crotch-engaging member 67 (see Fig. 7) which may be slipped over the bar 66 and function to directly engage the crotch.

To the section b may be secured a handle 85 (see Figs. 1, 2, 10 and 11) by means of which, when the sections are folded together, the stretcher may be conveniently carried. Preferably a container 86 is provided into which the stretcher, when the two sections are folded together, may be inserted; the container being slotted to allow the handle 85 to project therethrough. The container may be, for example, a canvas bag, split along the bottom, one end and top, to which a zipper fastener 87 may be applied.

What is claimed is:

1. A stretcher comprising a base plate having applied thereto a plate having a longitudinally extending slot and pairs of opposing recesses on opposite sides of, and opening into, said slot, a pin slidable in said slot, a device pivotally connected with said pin and movable, when in a horizontal position, to slide said pin along said slot and which, when swung on said pivot into an upright position, is engageable with a pair of recesses to hold it in adjusted upright position.

2. The combination specified in claim 1, in which said device comprises a hollow member having a projection on the end thereof, a sliding member within, and projecting beyond, said end of the hollow member and which is pivotally connected with said pin, and a spring within said hollow member adapted, when the hollow member is swung into an upright position, to actuate said hollow member to move said projection into engagement with a pair of recesses.

3. A stretcher comprising a pair of hingedly connected base sections, a plate secured to one of said base sections and having a longitudinally extending slot and pairs of opposing recesses on opposite sides of and opening into said slot, a pin slidably mounted in said slot, and a crotch supporting device including means pivotally connected with said pin and movable, when in a horizontal position, to slide said pin along said slot and which, when swung on said pivot into an upright position, is engageable with a pair of recesses to hold it in adjusted upright position, the slotted plate being secured to said one of said base plate sections near its hinged end and midway between its sides in approximate position to enable said device to engage the crotch of a body carried on a stretcher, said device also including a tubular member detachably secured to said means.

4. A stretcher comprising a pair of hinged sections each including a base plate, longitudinal edge portions of said base plate formed to provide longitudinally extending channel shaped reinforcing members for the base plate, said channels including outer downwardly extending flanges, and transversely extending members positioned between and having portions connected to the outer leg portions of said channels, said transversely extending members providing supports for the stretcher sections when the stretcher is placed upon a supporting surface.

5. A stretcher comprising a stretcher base, torso securing means on said base, individual bands adapted to engage each hand and foot of a human body carried by the stretcher, and individual straps secured to each band, a cam fastener for each strap, each of said straps being independently and adjustably secured to an associated cam fastener, and means mounting the cam fasteners to said stretcher base, the independent bands and straps cooperating with the torso securing means to tension the arms and legs of the body carried by the stretcher.

References Cited in the file of this patent

UNITED STATES PATENTS

| Number | Name | Date |
|---|---|---|
| 342,110 | Kjellstrom | May 18, 1886 |
| 2,141,100 | Warden | Dec. 20, 1938 |
| 2,175,748 | Dunn | Oct. 10, 1939 |
| 2,347,389 | Baker et al. | Apr. 25, 1944 |
| 2,361,789 | Nicholas | Oct. 31, 1944 |
| 2,362,721 | Reynolds | Nov. 14, 1944 |
| 2,377,940 | Hughes | June 12, 1945 |
| 2,392,850 | Johnson | Jan. 15, 1946 |
| 2,511,061 | Hughes | June 13, 1950 |

FOREIGN PATENTS

| Number | Country | Date |
|---|---|---|
| 116,901 | Australia | May 13, 1943 |